US010528649B2

(12) United States Patent
Wang et al.

(10) Patent No.: US 10,528,649 B2
(45) Date of Patent: Jan. 7, 2020

(54) RECOGNIZING UNSEEN FONTS BASED ON VISUAL SIMILARITY

(71) Applicant: Adobe Inc., San Jose, CA (US)

(72) Inventors: Zhaowen Wang, San Jose, CA (US); Hailin Jin, Campbell, VA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/280,505

(22) Filed: Sep. 29, 2016

(65) Prior Publication Data

US 2018/0089151 A1  Mar. 29, 2018

(51) Int. Cl.
 *G06F 17/21* (2006.01)
(52) U.S. Cl.
 CPC .................................. *G06F 17/214* (2013.01)
(58) Field of Classification Search
 CPC ......................................................... G06F 17/214
 USPC ........................................ 715/255, 256, 269
 See application file for complete search history.

(56) References Cited

U.S. PATENT DOCUMENTS

| | | | | |
|---|---|---|---|---|
| 5,253,307 A * | 10/1993 | Wayner | ..................... | G06K 9/50 382/181 |
| 5,335,289 A * | 8/1994 | Abdelazim | .............. | G06K 9/68 382/161 |
| 5,533,180 A * | 7/1996 | Zhou | ..................... | G06F 17/214 345/467 |
| 5,594,809 A * | 1/1997 | Kopec | .................. | G06K 9/6297 382/161 |
| 5,787,198 A * | 7/1998 | Agazzi | ................. | G06K 9/6297 382/196 |
| 6,272,238 B1 * | 8/2001 | Kugai | .................. | G06K 9/6828 382/165 |
| 6,978,418 B1 * | 12/2005 | Bain | ..................... | G06F 16/957 715/205 |
| 7,120,302 B1 * | 10/2006 | Billester | .............. | G06K 9/6857 382/229 |
| 9,063,682 B1 * | 6/2015 | Bradshaw | ............. | G06F 3/1244 |
| 9,317,777 B2 * | 4/2016 | Kaasila | ................. | G06F 17/214 |
| 2004/0041818 A1 * | 3/2004 | White | ................... | G06F 17/214 345/619 |
| 2004/0234128 A1 * | 11/2004 | Thiesson | ................ | G06K 9/222 382/186 |

(Continued)

OTHER PUBLICATIONS

Socher, Richard, et al,. "Zero-Shot Learning Through Cross-Modal Transfer," Advances in Neural Information Processing Systems, 2013, 10 pages.

(Continued)

*Primary Examiner* — Andrew R Dyer
(74) *Attorney, Agent, or Firm* — Kilpatrick Townsend & Stockton LLP

(57) ABSTRACT

Font recognition and similarity determination techniques and systems are described. For example, a computing device receives an image including a font and extracts font features corresponding to the font. The computing device computes font feature distances between the font and fonts from a set of training fonts. The computing device calculates, based on the font feature distances, similarity scores for the font and the training fonts used for calculating features distances. The computing device determines, based on the similarity scores, final similarity scores for the font relative to the training fonts.

20 Claims, 9 Drawing Sheets

(56) References Cited

U.S. PATENT DOCUMENTS

| | | | |
|---|---|---|---|
| 2006/0114485 A1* | 6/2006 | Sato | G06F 17/30271 358/1.13 |
| 2006/0129632 A1* | 6/2006 | Blume | G06F 3/122 709/203 |
| 2008/0181505 A1* | 7/2008 | Wu | G06F 16/5846 382/190 |
| 2008/0303822 A1* | 12/2008 | Taylor | G06F 17/214 345/467 |
| 2010/0067793 A1* | 3/2010 | Serrano | G06K 9/6297 382/179 |
| 2011/0033080 A1* | 2/2011 | King | G06K 9/00 382/100 |
| 2011/0103688 A1* | 5/2011 | Urbschat | G06K 9/03 382/182 |
| 2011/0276872 A1* | 11/2011 | Kataria | G06F 17/214 715/234 |
| 2015/0030238 A1* | 1/2015 | Yang | G06K 9/627 382/159 |
| 2015/0097842 A1* | 4/2015 | Kaasila | G06K 9/6215 345/471 |
| 2016/0307347 A1* | 10/2016 | Matteson | G06F 17/214 |

OTHER PUBLICATIONS

Palatucci, Mark, et al., "Zero-Shot Learning With Semantic Output Codes," Advances in Neural Information Processing Systems, 2009, 9 pages.

Rohrbach, Marcus, et al., "Evaluating Knowledge Transfer and Zero-Shot Learning in a Large-Scale Setting," Computer Vision and Pattern Recognition (CVPR), 2011 IEEE Conference on. IEEE, 2011, 8 pages.

Adobe Systems Incorporated, Adobe Photoshop Lightroom CC, https://helpx.adobe.com/lightroom/how-to/use-face-recognition-to-organize-photos.html?set=lightroom-fundamentals-organize-photos, accessed Sep. 29, 2016, 2 pages.

Google, "Name Tags (Face Tags) in Picasa3", https://sites.google.com/site/picasaresources/Home/Picasa-FAQ/picasa-help-center-pages/name-tags-in-picasa?pli=1, accessed Sep. 29, 2016, 6 pages.

\* cited by examiner

Example of recognizing local fonts

Example of recognizing local fonts

FIG. 5

Example of recognition results for a known font with similarity re-ranking

Example of recognition results for a known font without similarity re-ranking

RECOGNIZING UNSEEN FONTS BASED ON VISUAL SIMILARITY

This disclosure relates generally to computer-implemented methods and systems and more particularly relates to automatically identifying fonts in text images based on visual similarity to known fonts.

BACKGROUND

Creative professionals often use a variety of pictures and images as part of creating media content for marketing materials, presentations, backgrounds, book illustrations, web pages, and other media content. Creative professionals may locally create pictures and images that are incorporated into a design or creative professionals may obtain pictures and images from external sources, such as from a content sharing service. For example, creative professionals may create local images on their computing devices, which are then included in the content, such as a local, user-created image to be included in a presentation, and may obtain images from outside sources, such as a commercially available image from a content sharing service. Accordingly, even a single media content item may include a variety of images obtained from a variety of different sources.

Fonts used to render text in images and other content are one of the top elements in media content design. For example, images in media content include text, such as text in a logo, on a road sign, or on a clothing item. The appearance of such text in media content is important to conveying the intended meaning of a given design. For instance, a user has more interaction with the font and text than with other objects in the media content. Since the fonts are used to present text in the media content, a user reading text within media content typically more closely examines fonts than other objects in the content. As such, a designer's choice of fonts as well as visual consistency between fonts within media content is one of the most important factors in how the media content is perceived by an audience of users of the content.

Different fonts are used to render text with different appearances in various designs. For instance, designers and creative professionals choose fonts to establish a mood, convey a desired aesthetic, engender an emotion, communicate a meaning, generate interest, provide a unifying theme, or simply to attract attention. Accordingly, the appearance of text in media content is one of the top elements in graphic design, web design, interaction design, user interface design, and other types of design.

Being able to recognize a specific font from a text image is useful to designers, who may want to select typefaces according to an existing graphics design or based on an inspiration from others' work. Such font recognition and selection of visually similar fonts promotes consistency in appearance in text rendered using the fonts in media content. Thus, recognition of a font used to render text within an image and the ability to find similar fonts (e.g., to promote a similar look and feel to an item of media content) is an important factor in creation of media content.

Conventional digital medium environments used to create media content, however, support a limited ability to recognize fonts used to render text within an image as well as to locate visually similar fonts. Conventional techniques for font recognition typically rely on manual user interaction on the part of the creative professional, which may introduce errors. For example, conventional techniques may rely on manually selecting an image portion (e.g., by manually drawing a bounding box that surrounds the portion of the image) that is to be processed to recognize a font used to render text within the portion of the image. As such, conventional techniques are limited by accuracy of the manual selection in order to drawn the bounding box and the skill and dexterity of a user making the selection.

Although automated font recognition techniques exist, these are often also prone to error, resource intensive, and inefficient and thus limited to devices having sufficient processing resources to perform these existing techniques. An ever-increasing number of locally created fonts to be recognized increases the complexity of font recognition, and the required processing resources, for identifying fonts that are included in images.

Furthermore, existing font recognition techniques cannot deal with problems that arise when a design is transmitted from one computing device to another device. To render text in accordance with a desired font, a computing device refers to the desired font to access instructions that describe how to draw individual characters of text. However, not all fonts are known or present on all computing devices. For example, a font that is available on a source computing device may not be available on a deployment device where the font is to be presented. While existing technique can recognize fonts that have been seen in a set of training fonts used during a training stage on a computing device, such techniques cannot recognize fonts that are not included in the training set. This significantly limits the usefulness of existing font recognition techniques, as the number of available fonts is much larger than the size of a training set. For instance, new fonts are created locally on devices that are outside training sets and it impossible to enumerate all possible fonts a user can install on a local device.

Consequently, a deployment device may receive a design that identifies a font that is unknown or has not been seen by the development device (i.e., an unseen font). That deployment device is then responsible for determining the font type for the unseen font. Conventional approaches cannot recognize any unseen fonts. Thus, conventional approaches to font recognition present many disadvantages, such as (but not limited to) those described above.

SUMMARY

Certain embodiments described herein involve generating similarity scores that are useable for recognizing fonts based on visual similarity. For example, a font recognition tool, which is executed at a computing device, receives an image including a font. The font recognition tool extracts font features corresponding to the font (e.g., by generating feature vectors from the visual appearance of the font, where each vector values representing one of the font features). The font recognition tool accesses various training fonts and computes, based on the extracted font features and for each training font, a font feature distance between the font included in the received image and the training font. The font recognition tool calculates, based on the font feature distances, similarity scores for the font and the respective training fonts. The font recognition tool determines, based on the similarity scores, final similarity scores for the font relative to the respective training fonts. The final similarity scores are usable for font recognition and selection.

In one example, a system generates similarity scores that are useable for recognizing fonts based on visual similarity by performing at least three operations: (1) font recognition; (2) similarity feature evaluation; and (3) similarity based re-ranking. The font recognition operation involves finding the closest fonts from a training set to fonts detected in an input image. The similarity feature evaluation operation involves finding a similarity score between local fonts on a computing device or platform and training fonts (i.e., fonts in a training set). The similarity based re-ranking operation involves propagating a font recognition score to the local fonts so that the local fonts can be included in final font recognition results. In contrast to existing font recognition techniques, using the operations described above advantageously has a very low computational cost and adds little overhead.

In other example embodiments, a development device provides a font recognition tool or service to a deployment device to facilitate font recognition based on visual similarity. The font recognition tool or service enables a document presentation module to obtain a font features and font similarity scores from a remote location instead of locally extracting the font features and locally computing the font similarity scores. The development device receives an image from a remote computing device, such as the deployment device. The image includes multiple glyphs rendered using a font such that the image represents a visual appearance of the font. A font service module inputs the image including the multiple glyphs to a font visual similarity model trained with machine learning. The font service module further extracts font features corresponding to the font, where the font features are derived from the visual appearance of the font by the font visual similarity model. The computation by the font service module can entail computing similarity scores corresponding to similarity between the font and other fonts, with the similarity scores being based on multiple font features derived from a visual appearance of the font using an image including a glyph of an individual text character that is rendered using the font. The development device then transmits the similarity scores to the remote computing device (e.g., the deployment device).

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE FIGURES

These and other features, embodiments, and advantages of the present disclosure are better understood when the following Detailed Description is read with reference to the accompanying drawings, where:

FIG. 5 depicts an example user interface for displaying font recognition results for a known font based on similarity re-ranking, according to certain exemplary embodiments;

DETAILED DESCRIPTION

Figure 1:
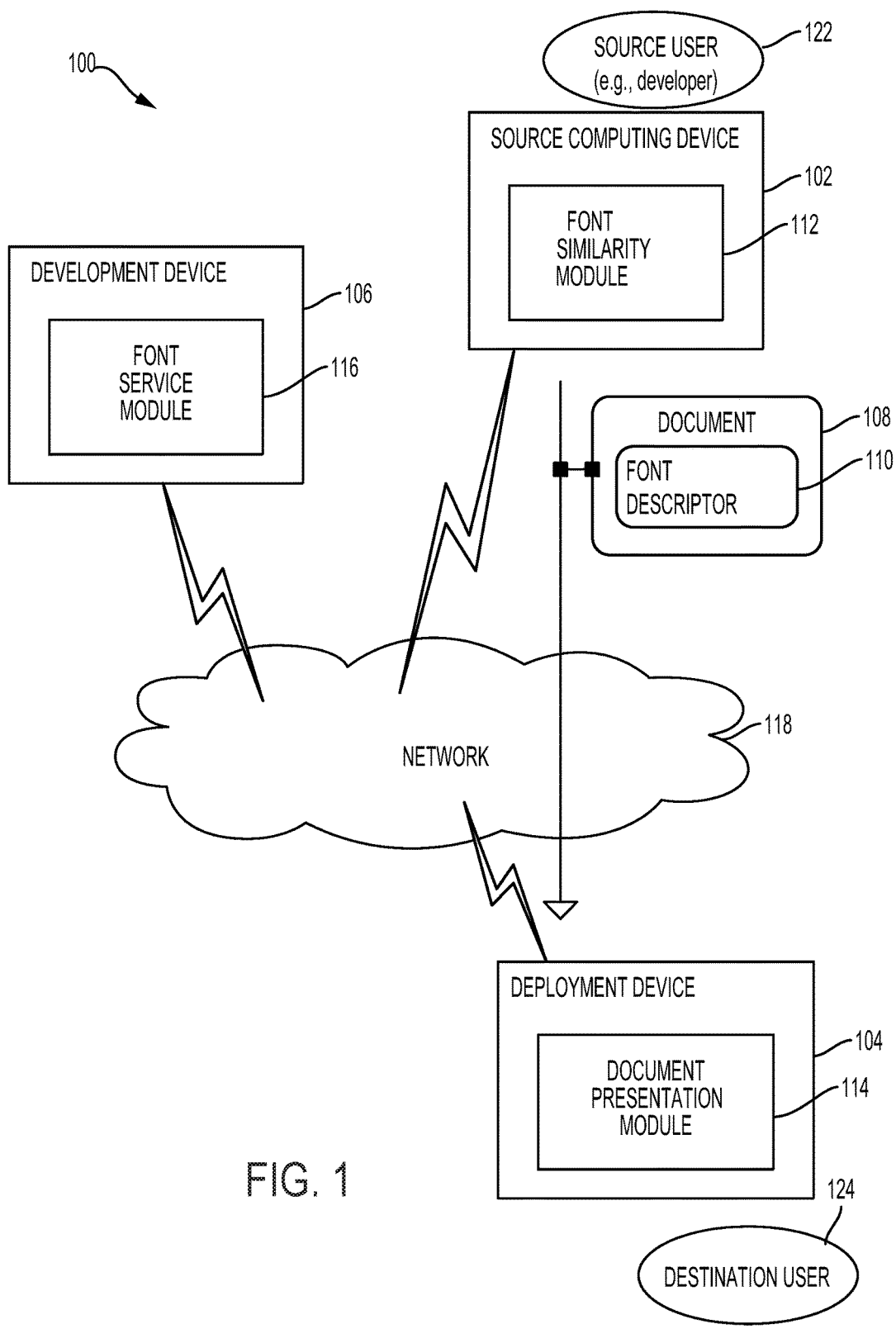
FIG. 1 illustrates an example environment that is operable to employ techniques for unseen font recognition based on visual similarity, according to certain exemplary embodiments.

Certain embodiments provide systems and methods for recognizing fonts based on visual similarity. As discussed above, if certain fonts are encountered at a deployment device (e.g., if a user installs or creates new fonts or if the device otherwise receives an image with a font that has not previously been used by the deployment device), existing font-recognition solutions are unable to recognize certain fonts if those fonts were not used to train a recognition model. By contrast, font-recognition systems described herein can recognize fonts using sufficient similarities between a newly encountered font and fonts that were used to train a font recognition model, even if the newly encountered font itself was not used to train the model.

For example, a deployment device recognizes fonts that are stored on a non-transitory computer-readable medium of the deployment device (or otherwise available to the deployment device). For instance, the deployment device executes a font similarity algorithm and thereby recognizes a font in a received image even if the font was used by a development device during a model-training process. In some embodiments, the font similarity algorithm uses a font descriptor that includes multiple font features derived from a visual appearance of the font by a font visual similarity model. The development device, which is separate from the deployment device, trains the font visual similarity model by executing a machine learning algorithm. The machine learning algorithm is tuned to recognize similarities between the visual appearances of two or more different fonts. The deployment device receives the trained font visual similarity model and employs the trained model to recognize fonts. For instance, if the deployment device receives an image having a font that has not been previously used by the deployment device, the deployment device executes the font similarity algorithm and thereby matches the font from the image to a similar font that was used by the development device to train the font visual similarity model.

Accordingly, text localization techniques are described in which a digital medium environment is configured to localize text in an image for an arbitrary font. These techniques also have increased accuracy (e.g., an improvement of approximately double as further described below), have increased efficiency such that these techniques take less than 0.1 second to process an image for a single word on a consumer graphics processing unit, and are not limited to a small set of simple fonts as in conventional automated techniques.

In order to so do, text localization techniques described herein train a model using machine learning (e.g., a convolutional neural network) using training images. The model is then used to localize text in a subsequently received image, and may do so automatically and without user intervention, e.g., without specifying any of the edges of the bounding box. In this way, manual specification of the bounding box in conventional techniques is avoided along with the inaccuracies involved in doing so. Further, these techniques are able to address arbitrary fonts and thus are not limited to a small set of particular fonts in conventional automated techniques, additional discussion of which is described in relation to FIGS. 1-11 in the following.

Further, techniques employed by conventional digital medium environments do not support a mechanism to locate similar fonts. Rather, conventional techniques rely solely on classification and not visual similarity, and thus are focused on discriminating between different fonts rather than retrieving visually similar fonts. As such, these conventional techniques are prone to inaccuracies if used for purposes other than classification. Accordingly, example techniques are described herein in which font similarity is used to find visually similar fonts for a given, previously-unseen font. For instance, font similarity may be used to determine which fonts are similar to an unseen font used to render text in an image, which may be used to navigate through hundreds or even thousands of fonts to find a visually similar font. In this way, a deployment device that has not previously seen the font may score and rank a vast collection of fonts to locate a font of interest based at least in part on similarity of fonts to the unseen font in order to present content in an efficient, intuitive, and accurate manner.

Techniques employed by conventional digital medium environments are limited and ignore potentially useful information in an attempt to perform font recognition and/or similarity. As used herein, the term "font recognition" refers to recognizing a font of text from an image, whereas the term "font similarity" refers to finding fonts that are visually similar fonts to a given font. Both techniques are used in embodiments in automated font selection for presenting documents at a deployment device.

Conventional techniques rely solely on an appearance of the fonts themselves to determine similarity and thus ignore other potentially useful information in making this determination. Accordingly, techniques are described herein that leverage attributes (e.g., font features) associated with fonts as part of font recognition and similarity determinations.

In the following discussion, an example environment is first described that can be used to implement the techniques described herein. An example font recognition system is then described, followed by a description of techniques which may be performed in the example environment and using the example system.

Example Environment

FIG. 1 illustrates an environment 100 that is operable to employ font recognition based on visual similarity. As shown, the example environment 100 includes a source user 122, a source computing device 102, a development device 106, a document 108, a network 118, a deployment device 104, and a destination user 124. In the example of FIG. 1, the source user 122 is a developer or designer of media content included in the document 108. The source computing device 102 includes a document preparation module 112 and is associated with the source user 122. The deployment device 104 includes a document presentation module 114 and is associated with the destination user 124. The development device 106 includes a font service module 116.

In certain embodiments, the source user 122 creates the document 108, which includes text in an original font that is selected by the source user 122 (i.e., the developer or document designer in the example of FIG. 1). The document preparation module 112 prepares the document 108 for dissemination (e.g., transmission to deployment device 104) by embedding a font descriptor 110 to the document 108. The font descriptor 110 corresponds to a font used in the document 108 and is a feature representation of the font.

Example Font Descriptors and Calculation of Font Similarity

Figure 9:
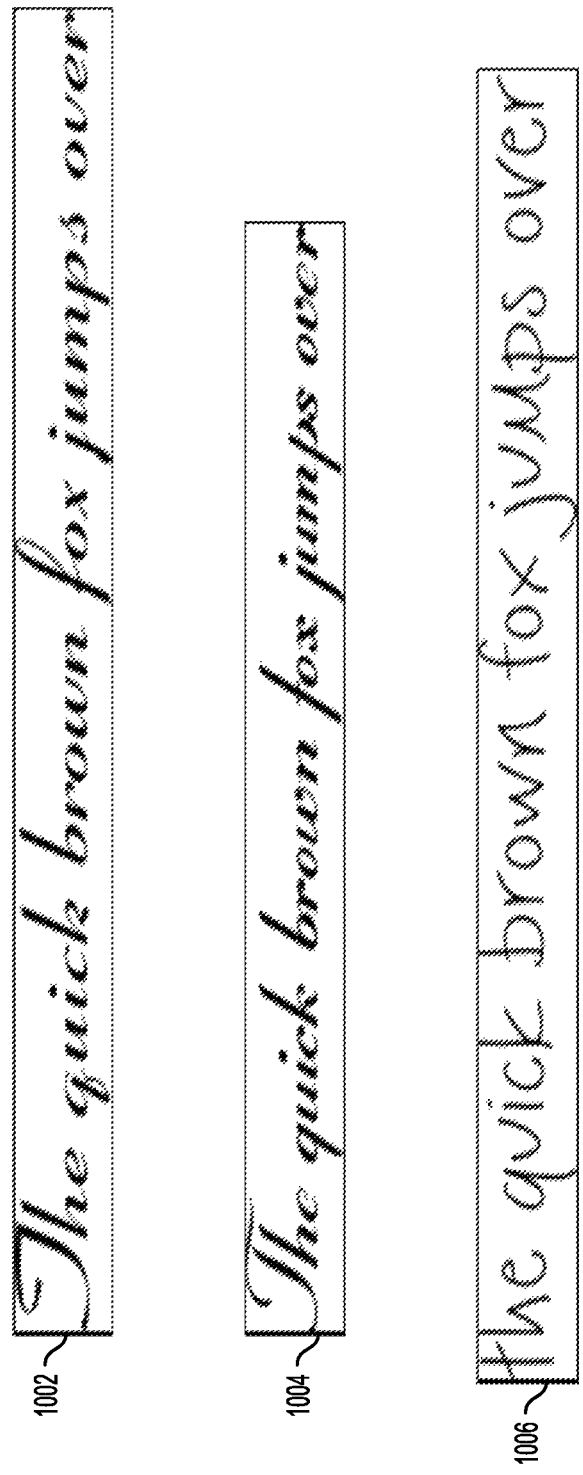
FIG. 9 illustrates examples of font for input to font recognition, according to certain exemplary embodiments.

As illustrated by FIG. 9 and in certain embodiments, the font descriptor 110 is a vector of real numbers, and can include hundreds of dimensions. For example, the font descriptor 110 can represent font features extracted as neuron responses from a layer of a convolutional neural network with the rendered text image as network input. For instance, with a font A 1002 included in the document 108, the text image can be rendered as shown.

Font A 1002 can be used as input to a neural network, and output can be extracted from a fifth convolution layer as a 760-dimensional vector with unit length (showing only the first three entries in this example): [0.23, 0.12, −0.96, . . . ]. Similarly, for the example fonts B 1004 and C 1006 in FIG. 9, their images can be rendered as shown below and their respective features can be font descriptors that are calculated as follows:

The image for font B 1004 can also be used as input to the neural network, and output can be extracted as a vector (again, showing only the first three entries in this example): [0.10, 0.06, −0.99, . . . ].

The image in FIG. 9 for font C 1006 can be used as input to the neural network, and output can be extracted as another vector (again, showing only the first three entries in this example): [0.92, 0.35, 0.17, . . . ].

In some embodiments, to measure similarity between fonts A and B, denoted as S(A, B), the inner product of their respective features is taken as shown below:

$$S(A,B)=0.23*0.10+0.12*0.06+(-0.96)*(-0.99)+=0.98$$

To measure similarity between fonts A and C, denoted as S(A, C), the inner product is taken as follows:

$$S(A,C)=0.23*0.92+0.12*0.35+(-0.96)*(0.17)+=0.09$$

In the above examples, the font features indicate that font B is more similar to font A than it is to font C, which agrees with visual perception of these fonts. That is the calculated similarity of font A to font B, S(A, B), 0.98, is greater than the calculated similarity of font A to font C, S(A, C), 0.09. Thus, in this example, the respective font descriptors of fonts A, B, and C are used to determine that fonts A and B are more visually similar to each other than are fonts A and C.

In some embodiments, the source computing device 102 or the deployment device 104 can be implemented as an end-user computing device, such as a desktop or tablet computing device. In alternative or additional embodiments, the source computing device 102 or the development device 106 can be implemented as a server computing device, such as a web server or a cloud-based server. For instance, the source computing device 102 can be implemented as a server computing device if a web server prepares a web page document for downloading to a web browser on a destination user device such as the deployment device 104. In alternative or additional embodiments, the deployment device 104 can be implemented as a server computing device that receives the document 108 from an app executing on an end-user computing device, with the document 108 to be published to a social media stream. The development device 106 can likewise be implemented as an end-user computing device or a server device.

Thus, the computing devices 102, 104, and 106 can be implemented as any suitable type of computing device. Examples of end-user computing devices include a desktop computer, a laptop computer, a mobile phone, a gaming console, a portable gaming device, a tablet device, an Internet-of-things (IoT) device, an entertainment appliance such as a smart television, a wearable computing device such as a smart watch, a virtual or augmented reality device, a device configured to provide 2D or 3D image output, or some combination thereof. Hence, an end-user implementation of any of the computing devices may range from a relatively high-resource device with substantial memory and processor resources (e.g., a personal computer or game console) to a relatively low-resource device with constrained memory or processing resources (e.g., a mobile or wearable device). Examples of server computing devices include a web server, a cloud-based server, a content repository, a server farm, server functionality distributed across one or more data centers, or some combination thereof.

The computing devices 102, 104, or 106 can communicate with each other via the network 118. The network 118 may be a data network formed from at least a portion of one or more network types. Examples of network types include a public network, a private network, the Internet, an Ethernet, an intranet, an extranet, a local area network (LAN), a wide area network (WAN), a wireless network such as a Wi-Fi network, a cellular network, a Long-Term Evolution (LTE) network, or a Bluetooth network, a wired network, a public-switched telephone network (PSTN), or some combination thereof. Each of the computing devices 102, 104, or 106 can include a variety of hardware components, such as a processing system, at least one processor, a memory, one or more network interfaces, and some combination thereof (e.g., on an application specific integrated circuit (ASIC) or as instructions are loaded into a processor). A processing system is representative of functionality to perform operations through execution of instructions stored in a memory. These and other hardware components are contemplated as described herein with reference to FIG. 11.

In example implementations, each module 112, 114, or 116 is located at or executing on a respective computing device 102, 104, or 106. A module may be realized as a standalone application, may be part of a larger application, may be implemented as a downloaded application or web browser part, may be incorporated into an operating system (OS), may be implemented as a library or an application programming interface (API) available to another program, and so forth. Each module 112, 114, or 116 represents functionality to implement schemes and techniques for font recognition based on visual similarity as described herein. The modules can be implemented as at least part of a software package that executes on and specially configures one or more processors, which processors may physically realize a processing system; as a hardware apparatus, which may be realized as an ASIC or as an overall computing device; or using a combination of software, firmware, hardware, or fixed logic circuitry; with some combination thereof; and so forth. Each module may be fully or partially implemented as a web or cloud-based application or service. Further, although single computing devices 102, 104, or 106 are shown in FIG. 1, each illustrated device 102, 104, or 106 may be representative of a plurality of different devices or distributed computing resources that interoperate or coordinate to perform operations as a web service or as a cloud-based service.

Having considered the example environment 100, the following sections describe example systems and techniques for font recognition based on visual similarity.

Example System

Figure 2:
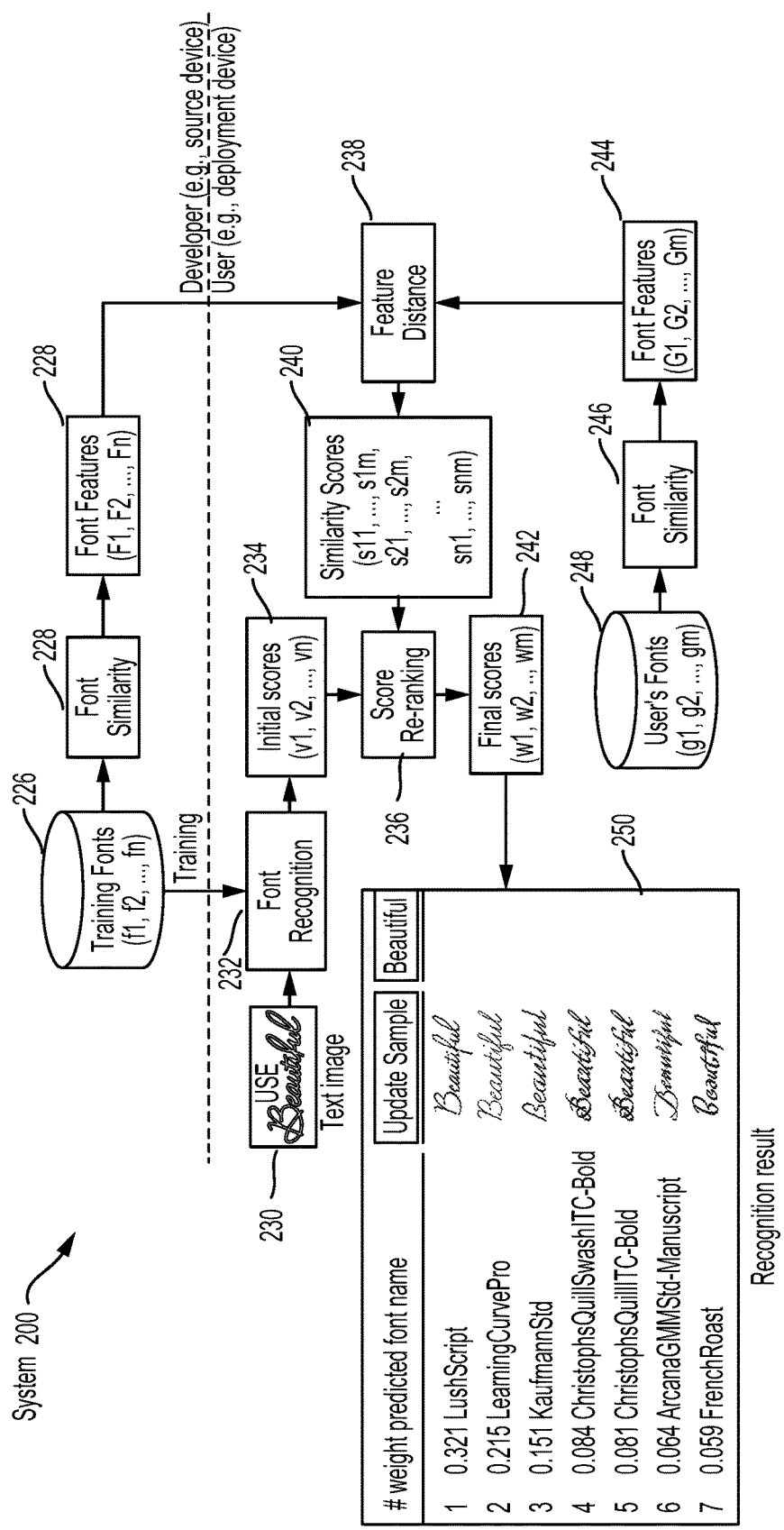
FIG. 2 is a block diagram of an example system that is operable to employ font recognition and similarity determination techniques, according to certain exemplary embodiments.

FIG. 2 is an illustration of a font recognition and similarity system 200 that is operable to perform image font recognition and image font similarity techniques. The illustrated system 200 can be implemented using one or more computing devices, which may be configured in a variety of ways. For example, the font recognition system 200 can be implemented as a feature in a desktop image editor or graphics editor. In this example, a base font recognition model and font similarity feature extraction model, together with pre-calculated similarity features of a set of training fonts 226 can be included as features of the image or graphics editor. On a user's device (e.g., a deployment device), there can be a one-time calculation of similarity features for unseen fonts that are not in the set of training fonts 226, but are installed on the user's system. The system 200 can invoke a font recognition component 232 and a score re-ranking component 236 to efficiently perform font recognition and similarity scoring for each received text image 230. In this way, the computing resources required on the user's device is reduced and much lower than the computations required by existing techniques. In one example, the system 200 can perform font recognition tasks for one text image 230 in about 0.3 seconds.

The system 200 is representative of functionality of a computing device configured to recognize fonts in an image that includes text, shapes or other visual objects, as well as fonts occurring in spreadsheets, in a document, in multimedia content, in a presentation document, and in other types of content. FIG. 2 depicts components of the font recognition and similarity system 200. This system 200 is representative of functionality to find similar fonts and employ font attributes for font recognition and similarity.

As shown in the example embodiment of FIG. 2, system 200 is a distributed system with components and functionality distributed between a developer platform (e.g., a source computing device) and a user side (e.g., a deployment device). In an alternative embodiment, all of the components of system 200 could reside on a single platform. In the example of FIG. 2, the developer side includes a set of training fonts 226, and a font similarity component 228 that uses the training fonts 226 to extract font features of the training fonts. These font features are then passed to a feature distance component 238 on the user side.

There are three main components in the system 200. In the example of FIG. 2, these components are on a deployment device and the functionality of the three main components is described in the following paragraphs.

First, a base font recognition component 232 assigns an initial classification score $v_i$ for each font $f_i$ in the set of training fonts 226 based on a given text image 230. A set of these initial recognition scores 234 (i.e., initial classification scores) is used by a score re-ranking component 236, which is described below. As shown in FIG. 2, the base font recognition component 232 uses a set of training fonts 226 on the developer device as input. In one non-limiting embodiment, there are approximately 20,000 fonts in the set of training fonts 226. After training using the set of training fonts 226, a network model for the font recognition system 200 is created. According to this embodiment, the system 200 can take a text image 230 as input and use the other components described below to produce an output factor of 20,000 dimensions, which represents the probability over the 20,000 training fonts that indicates how likely it is that fonts in the text image 230 correspond to each of the training fonts 226. In this way, the system 200 can recognize fonts that are in the set of training fonts 226. Additionally, in contrast to existing techniques, the system 200 can recognize the user's local fonts 248 that are not included in the set of training fonts 226. This is accomplished by using the font similarity component 246, which is described in the following paragraph.

Second, a font similarity component 246 evaluates a feature vector descriptor for each training font $f_i$ and each user's font $g_j$ in a set of the user's fonts 248 based on their respective font files. The font features 244 (feature vectors) are used to calculate a similarity score $s_{ij}$ for each font pair($f_i$, $g_j$), shown as similarity scores 240 in FIG. 2. Respective font similarity components 228, 246 are used on both the developer side (developer font similarity component 228) and the user side (font similarity component 246). As shown, the developer font similarity component 228 is used to determine font features based on the set of training fonts 226, and font similarity component 246 is used to determine font features based on the user's fonts 248. In both cases, the respective font features for the training fonts 226 and user's fonts 248 are an output factor for each of the fonts 226, 248. In an embodiment, each factor is a number of real value numbers that indicates the feature representative for each of the fonts. In this way, the system 200 can compare the visual similarity of a given font to other fonts using a numerical method. Once the system 200 obtains the feature representation for both the training fonts 226 and user's local fonts 248, then the system 200 can take the end product of those feature factors. In this way, the system 200 can determine feature distances and font similarity scores 240 for pairs of fonts. A similarity score 240 is the pairwise similarity function between each pair of test fonts and the training fonts 226.

Third, the score re-ranking component 236 determines a final classification score $w_j$ for each user's font $g_j$ by combining all the classification scores $v_i$ and similarity scores $s_{ij}$ from the similarity scores 240. As shown, these final scores 242 are used to identify recognition results 250, where the top recognition results 250 are those fonts with the highest $w_j$ scores. In the example of FIG. 2, the recognition results 250 include a numerical rank, a weight, a predicted font name, and a sample image for each font.

By using the above-described components of system 200, any font on a user's local device (e.g., a deployment device) can be recognized and assigned a recognition result 250. If a local font is similar to a training font in visual style, it is very likely the local font will be included in the top recognition results even if it does not appear in the training set 226. In system 200, there is no extra model training occurring on the user's local machine (e.g., the deployment device). In system 200, there is also no need for the user to provide additional or extra information about the unseen fonts. That is, all the font information can be automatically obtained from font files installed on the user's system.

The system 200 can incorporate any realization of font recognition and font similarity. For example, the system 200 implements the base font recognition component 232 and the font similarity component 246 while also using a convolutional neural network (CNN) as the machine learning model for both font recognition and similarity feature extraction to extract font features 244. In training, the system 200 can use approximately 20 thousand (n=20 k) font files to generate millions of training text images. The CNN is trained such that given an input image 230, it can correctly recognize the font type of the text in the image from the 20 thousand possible font candidates. The output of the CNN is a 20 k dimensional probability vector with entries in the range of [0, 1]. This probability vector gives the initial recognition scores 234 $[v_1, v_2, \ldots, v_n]$.

To extract feature descriptors for font similarity evaluation, the system 200 can also use a CNN trained in a similar way. The difference is that the system 200 uses the font file of a particular font to render a predefined glyph sequence on an image. In this embodiment, the image is fed into the CNN and the system 200 uses the neuron responses from an intermediate layer as the feature for this font. In this example, the system 200 extracts font features that include a feature vector $F_i$ for each training font $f_i$ in the training fonts 226 and font features 244 that include a feature vector $G_j$ for each user's font $g_j$ included in the set of user's fonts 248. Here, $F_i$ and $G_j$ are vectors of floating numbers, where the vectors have the same dimensions. Given the font feature descriptors, the visual similarity between a training font $f_i$ in the training fonts 226 and a user font $g_j$ in the user's fonts 248 can be calculated as the inner product of their feature descriptors as follows: $s_{ij} = F_i^T G_j$.

Such a similarity score is calculated for each pair of a training font in the training fonts 226 and a user font in the user's fonts 248 (i.e., to determine how similar each user font is to training fonts in the training fonts 226), and also for each pair of training fonts (i.e., to determine how similar a given training font is to other training fonts in the training fonts 226).

Re-Ranking Fonts

If a particular user's font $g_j$ in the set of user's fonts 248 is not included in the set of training fonts 226, then that user font $g_j$ has no associated entry in the initial recognition scores 234 (e.g., in initial recognition score vector $[v_1, v_2, \ldots, v_n]$). In this case, that user font $g_j$ cannot initially be recognized. To overcome this limitation, the system 200 uses the score re-ranking component 236. The score re-ranking component 236 propagates the initial recognition scores 234 to the user's font $g_j$ based on its similarity to the training fonts, which is calculated as follows: $w_j = \Sigma_i s_{ij} v_i$ This $w_j$ value can be interpreted as the expected similarity score between the font in the text image 230 and the user's font $g_j$. The score re-ranking component 236 calculates this re-ranking score for every font in the user's fonts 248, and obtains the final scores 242 for font recognition: $[w_1, w_2, \ldots w_m]$. In the example of FIG. 2, the fonts with largest final scores 242 are provided as the top recognition results 250 that are returned to the user of the deployment device (e.g., the destination user 124 shown in FIG. 1).

The components of system 200 illustrated in FIG. 2 can be modules which are storable in the memory of computing devices, and as such are implemented at least partially in hardware. For example, the font recognition component 232, the font similarity component 246, and the score re-ranking component 236 are executable by the system 200 to cause performance of one or more font recognition operations. Other implementations are also contemplated, such as, for example, implementation as dedicated hardware components, e.g., application specific integrated circuit (ASIC) and fixed-logic circuitry.

Having described a system that is operable to employ the techniques described herein, discussion is now made in the following sections further providing examples of font recognition techniques.

Recognizing Local Fonts

Figure 3:
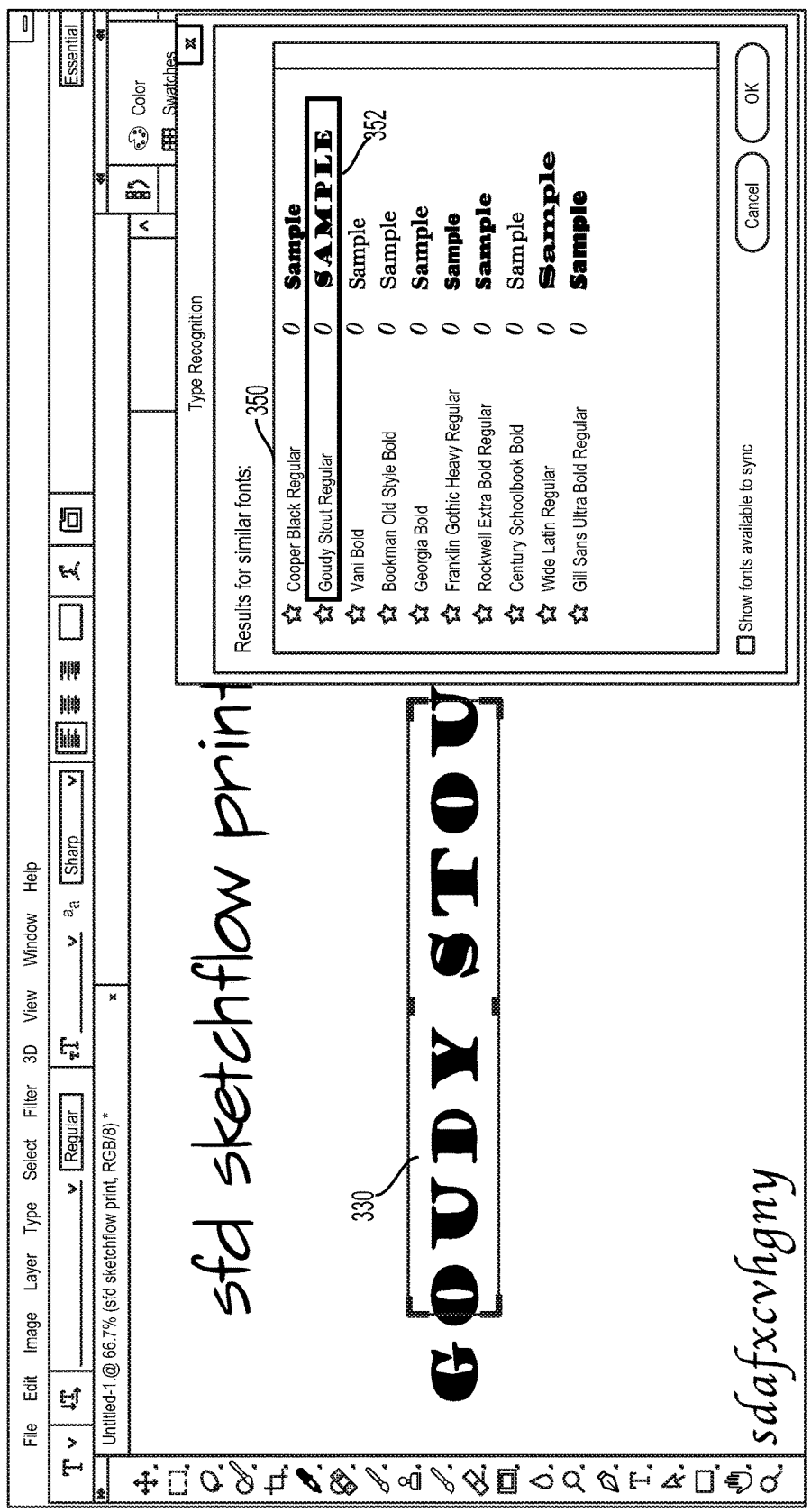
FIG. 3 depicts an example of a user interface for displaying results of successful recognition of a user's local fonts based on visual similarity, according to certain exemplary embodiments.
Figure 4:
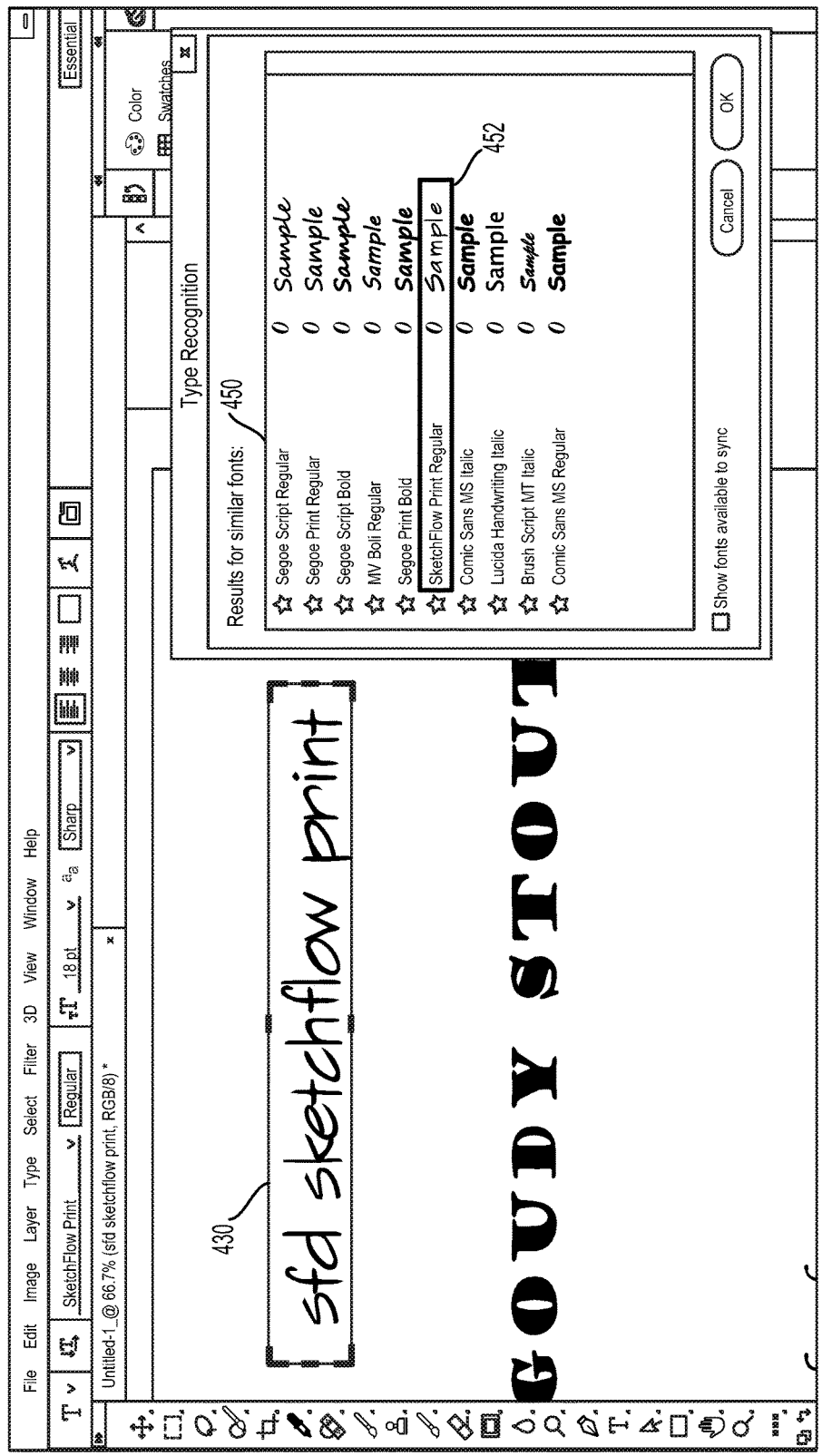
FIG. 4 depicts another example of a user interface for displaying results of successful recognition of a user's local fonts based on visual similarity, according to certain exemplary embodiments.

Examples of successful recognition of a user's local fonts are depicted in FIGS. 3 and 4. In particular, FIGS. 3 and 4 depict an example of a user interface for displaying results for recognizing local fonts within an image editing application or a graphics editing application. In FIG. 3, the input text image 330 is a cropped area of an image displayed on the canvas on the left side of the user interface, and the font recognition results 350 are listed in the dialog box on the right side of the interface. As shown, the font recognition results 350 include a top result 352 that has been determined to be most visually similar to the font within input text image 330. Similarly, in FIG. 4, the input text image 430 is a cropped area of another image on the canvas, and the font recognition results 450 for that input image 430 are listed in the dialog box on the right side of the user interface, where the font recognition results 450 include a top result 452 that has been identified as being most visually similar to the font within input text image 430.

In the embodiments shown in FIGS. 3 and 4, although the example fonts "Goudy Stout Regular" and "SketchFlow Print Regular" are not in a training set of training fonts (e.g., training fonts 226 of FIG. 2), the fonts can still be correctly recognized in as the top, or most similar result 352, 452 in the respective result lists 350, 450 displayed in the dialog boxes. With conventional font recognition systems and techniques, there is no automated way to recognize these fonts.

Figure 5:
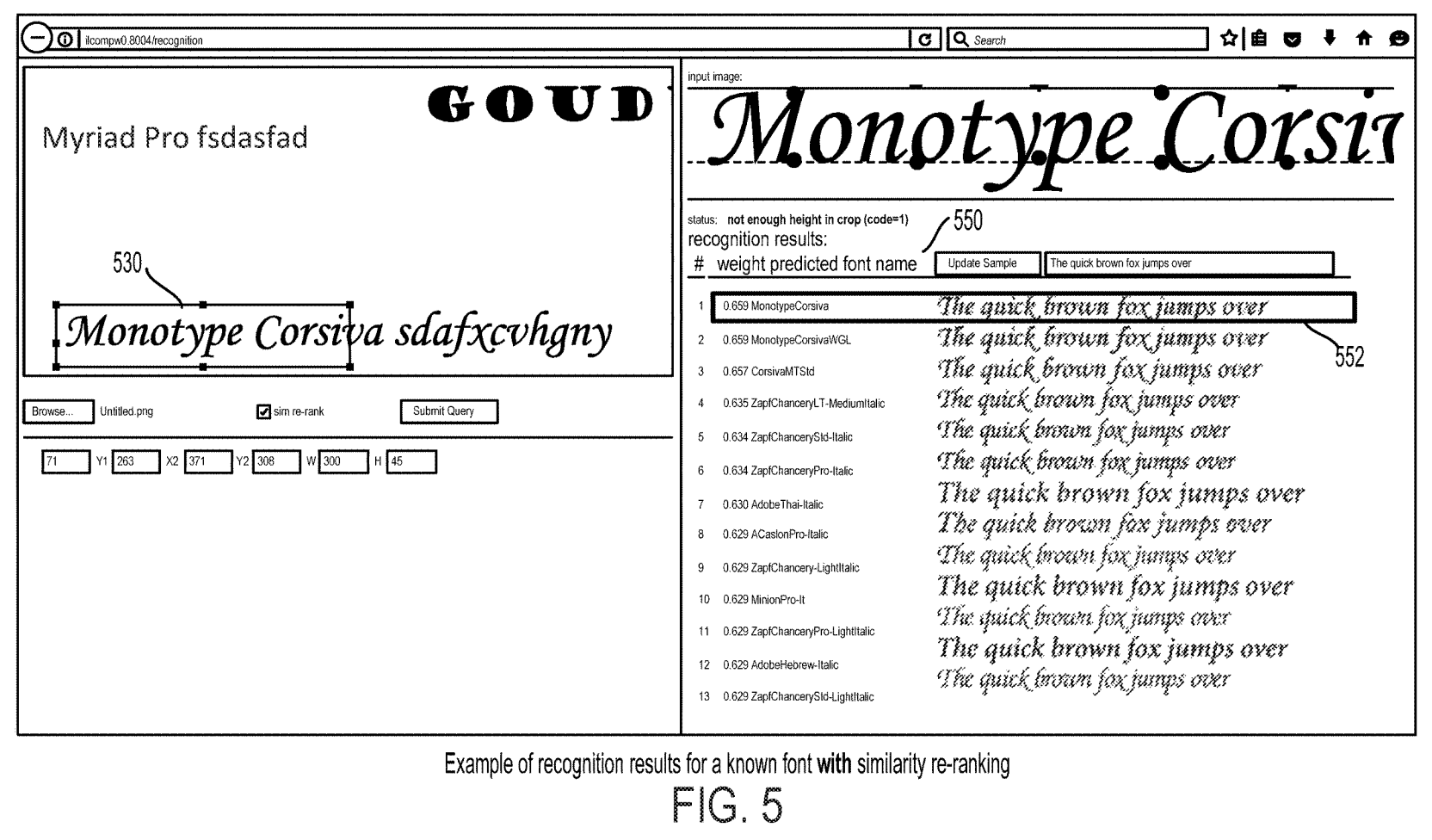
Figure 6:
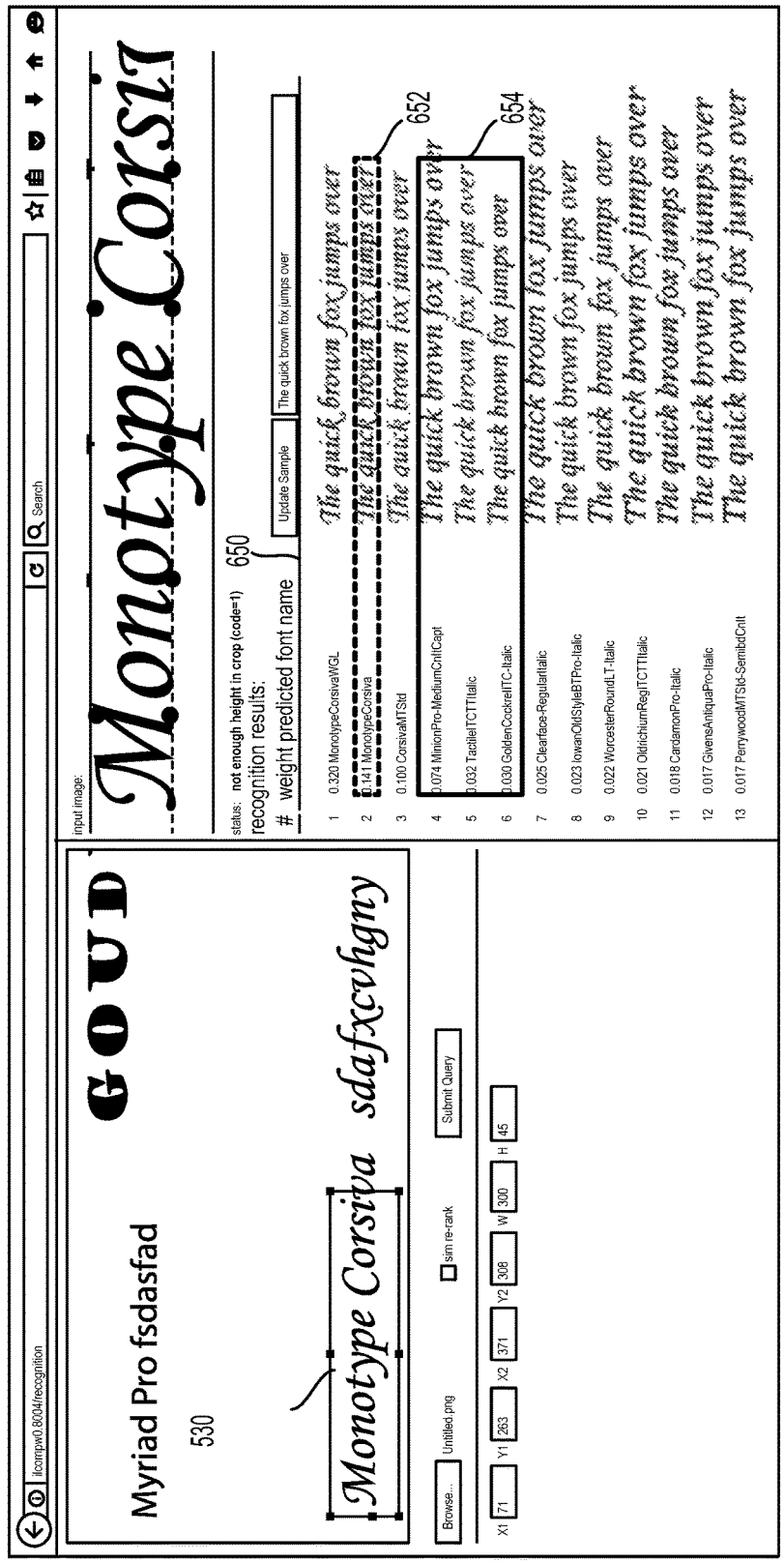
FIG. 6 depicts an example user interface for displaying font recognition results for a known font without using similarity re-ranking, according to certain exemplary embodiments.

FIGS. 5 and 6 demonstrate the difference in font recognition results with and without using the score re-ranking component 236. FIG. 5 depicts a user interface that shows the result of using a re-ranking step in a font recognition system. In particular, FIG. 5 depicts an example user interface for displaying font recognition results for a known font based on similarity re-ranking. FIG. 6 depicts an example user interface for displaying font recognition results for a known font without using similarity re-ranking. The example results depicted in FIGS. 5 and 6 show how re-ranking (e.g., by using score re-ranking component 236 of the system 200 shown in FIG. 2) can improve font recognition results for seen or known training fonts.

In FIGS. 5 and 6, the input image 530 has text rendered with the "MonotypeCorsiva" font, which in this example is included in a set of training fonts. FIG. 5 shows that when re-ranking is used, the correct font appears as the top result 552 in the result list 550, and the first six results in the result list 550 are also very similar to the "MonotypeCorsiva" font.

FIG. 6 shows the results if the base font recognition system 200 is used without the score re-ranking component 236. In this example, the correct font type appears in the second place 652 of the result list 650. Moreover, the other results 654 after the top three results are not very similar to the "MonotypeCorsiva" font. FIGS. 5 and 6 show how, by using similarity re-ranking, font recognition accuracy as well as the visual relevance of the returned results are both improved. As shown in FIGS. 5 and 6, the result lists 550 and 650 each include a numerical font rank, a weight, and a predicted font name for each font in the results list, where fonts with the highest weights are listed as top-ranked results.

Example Method for Font Recognition

Figure 7:
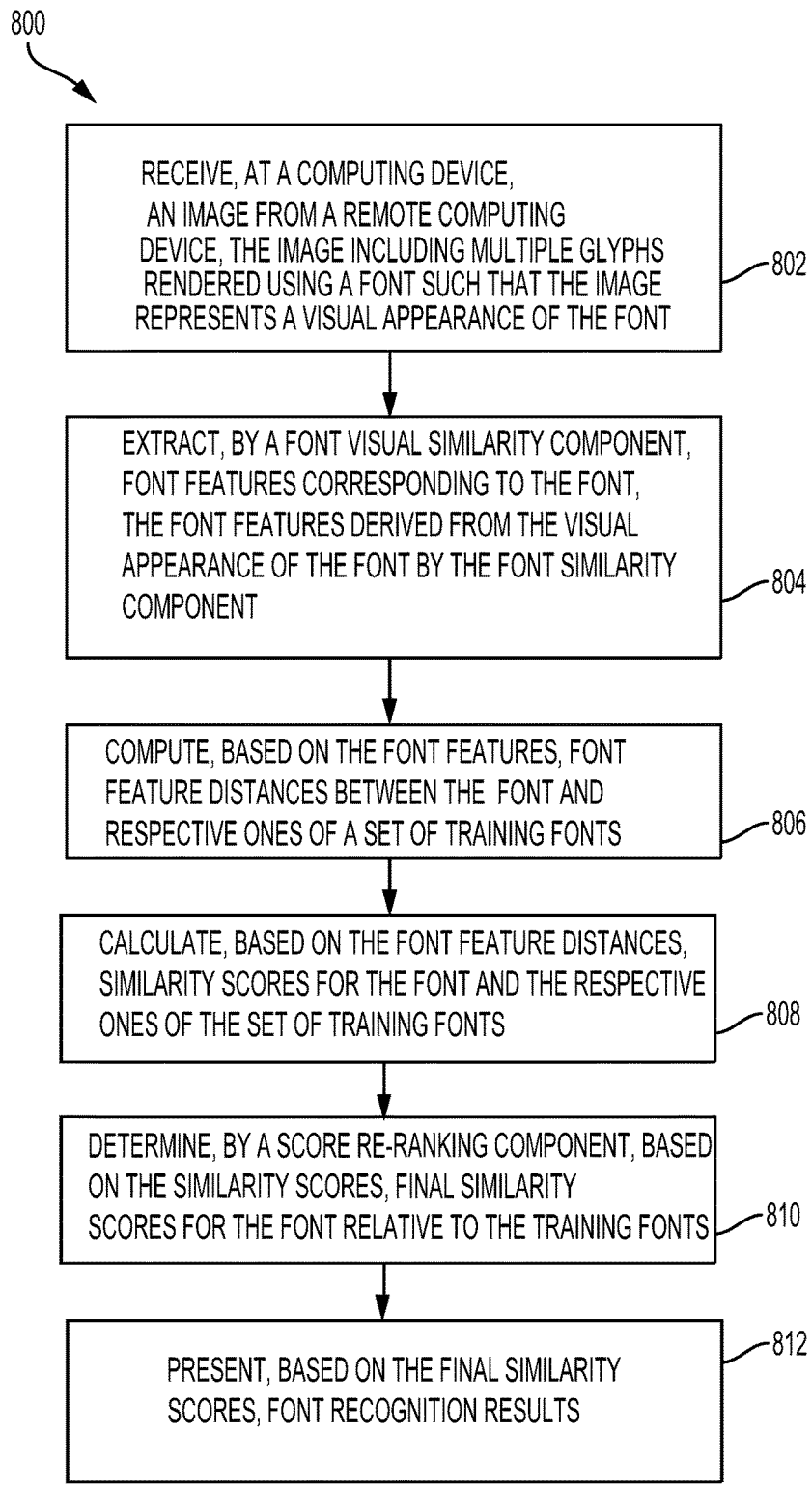
FIG. 7 is a flow chart depicting an example of a process for recognizing an unseen font from a text image, according to certain exemplary embodiments.

FIG. 7 is a flow chart depicting an example of a font recognition process 800 for recognizing an unseen/unavailable font that is included in a text image. In particular, FIG. 7 depicts a flowchart illustrating a process 800 for determining an unseen/unavailable font type from a text image by matching the unseen font to a font seen in a training process. The process 800 depicted in FIG. 7 is described with continued reference to the embodiments of FIGS. 1-6. However, the process 800 is not limited to those example embodiments.

The example process 800 uses three main components: (1) font recognition; (2) similarity feature evaluation; and (3) similarity based re-ranking. The font recognition process 800 finds the closest fonts from a training set to an unseen font detected in a received image. Similarity evaluation finds a similarity score between that unseen, local font on a computing device and the training fonts (i.e., fonts in the training set).

The font recognition process 800 begins at block 802 where an image is received. As shown, process 800 can be a computer-implemented method and block 802 can include receiving the image at a computing device from a remote computing device. In block 802 the computing device can be a user computing device or a deployment device 104, and the remote computing device can be a source computing device 102. The received image can be a text image 230 that includes a font that has not been seen or is not available on the computing device (e.g., an unseen font). In the example of FIG. 7, the image received at block 802 can include multiple glyphs rendered using the unseen font such that the image represents a visual appearance of the unseen font.

Next, at block 804, the process 800 further includes extracting, by a font similarity component, font features corresponding to the unseen font. As shown, the extracted font features are derived in block 804 from the visual appearance of the font by the font similarity component. In an embodiment, block 804 can be performed by invoking font similarity component 246 to extract font features 244.

Then, at block 806, the process 800 includes computing, based on the extracted font features, font feature distances between the font and respective training fonts. Block 806 can be performed by a feature distance component 238. Block 806 can include computing respective feature distances between each of the extracted font features 244 and respective ones of the font features of the database. In the example of FIG. 7, block 806 can include computing feature distances between features of the unseen font and features of respective training fonts (e.g., training fonts 226 of FIG. 2).

Next, at block 808, the process 800 further includes calculating, based on the font feature distances, similarity scores for the font and the respective ones of the set of training fonts and font similarity scores 240 for pairs of fonts. Block 808 includes similarity feature evaluation for the unseen font and the training fonts. Block 808 can include calculating similarity scores 240, where a similarity score is the pairwise similarity function between the unseen font and the respective training fonts 226. Block 808 can further include calculating similarity scores 240 as the pairwise similarity function between each pair of test fonts and the training fonts 226.

Then, at block 810, the process includes determining, by a score re-ranking component, based on the similarity scores, final similarity scores for the font relative to the training fonts. Block 810 can perform similarity based re-ranking by invoking the score re-ranking component 236 to efficiently perform similarity scoring for the unseen font included in the received text image 230. In block 810, similarity based re-ranking propagates a font recognition score to the unseen font and other local fonts on the computing device so that the local fonts can be included in final font recognition results.

Next, at block 812, font recognition results are presented. As shown, the font recognition results are based on the final similarity scores determined at block 810. Block 812 can include presenting recognition results 250 in a user interface displayed to a user of the computing device. For example, block 812 can include rendering, on a display of the computing device, a list of recognition results similar to the results 350, 450, and 650 shown in FIGS. 3-5.

The process 800 can be implemented in a hybrid system that uses a font recognition algorithm for blocks 802-908, and a separate similarity-based re-ranking component for block 810. The similarity-based re-ranking component 236 can be used for any font and without requiring user input. The computer-implemented process 800 on has a very low computational cost and adds little overhead as compared to existing font recognition methods.

In some embodiments, font recognition is facilitated using the similarity scores that are computed as described herein. In one example, a developer or other user of the source computing device 102 (e.g., the source user 122 of FIG. 1) creates a document 108 that includes a font image. That is, the document 108 is designed with text to be rendered in accordance with the font image, without embedding the font image in the document. The document preparation module 112 applies the font image to a font visual similarity model. For instance, an image of textual output rendered in accordance with the font image is input to the font visual similarity model. The font visual similarity model is generated using machine learning, as described above with reference to FIG. 5. Based on the image of the font image, the font visual similarity model outputs font features that characterize the visual appearance of the font image. The document preparation module 112 appends a font descriptor 110 that includes the font features to the document 108 and transmits the document 108 having the font descriptor 110 to the document presentation module 114 via the network 118.

The document presentation module 114, which executes at the deployment device 104, receives the document 108 having the font descriptor 110 from the document preparation module 112 via the network 118. The document presentation module 114 extracts the font descriptor 110 from the document 108. Once the font descriptor 110 is extracted, the font features 244 included in the font descriptor are also extracted. The document presentation module 114 identifies a similar font descriptor having features similar to the extracted font features 244 (e.g., by querying a font descriptor-to-local font database accessible to the deployment device 104 and associating each local font with a corresponding font descriptor).

A font descriptor that corresponds to a local font is computed using a font visual similarity model generated with machine learning. The document presentation module 114 compares the extracted font features 244 to the font features in entries in the font descriptor-to-local font database. Respective feature distances between each of extracted font features 244 and respective ones of the font features of the font descriptor-to-local font database are calculated by the feature distance component 238 discussed above with reference to FIG. 2. In some embodiments, one or more of the smaller or smallest feature distances between the font features 244 and respective ones of the font features in the font descriptor-to-local font database are ascertained.

The document presentation module 114 identifies a similar font descriptor based on these calculated feature distances. For instance, the font feature in the font descriptor-to-local font database that has the smallest feature distance from the extracted font feature 244 is determined to be a similar font descriptor, and a local font corresponding to that similar font descriptor is considered to be a similar font with respect to the font image included in the document 108 by the source user 122. The document presentation module 114 renders a presentation with the document 108 using the similar font. For example, the document presentation module 114 can render, on a display device of the deployment device 104, the document 108 with at least some text being rendered using the similar font.

Example System and Computing Device

Figure 8:
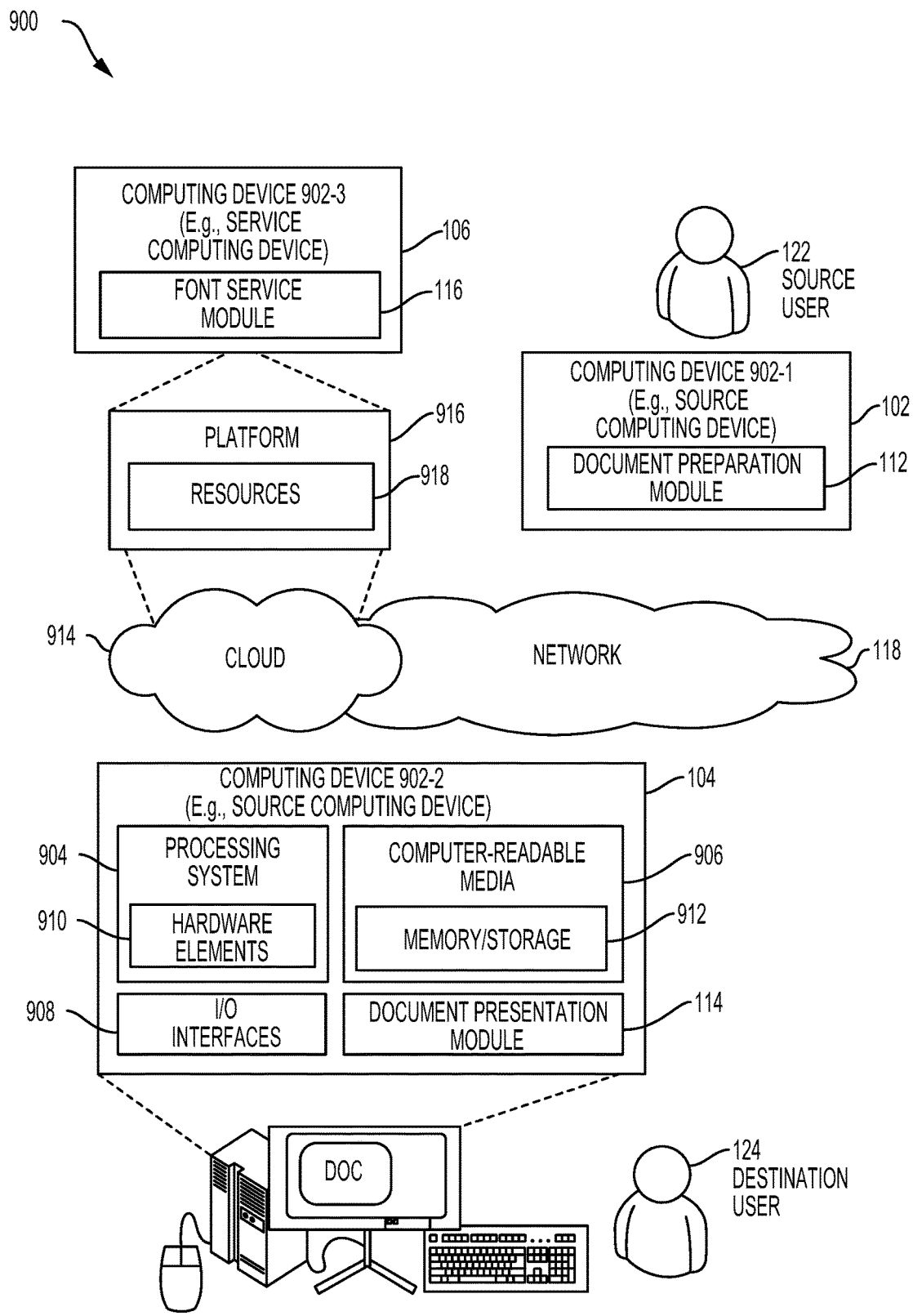
FIG. 8 is a block diagram depicting an example system including components of computing devices that can be employed for font recognition based on visual similarity, according to certain exemplary embodiments.

FIG. 8 illustrates an example system generally at 1000 including example computing devices 900 representative of one or more computing systems or computing devices that may implement the various techniques described herein. This is illustrated through the inclusion of various modules, which may operate as described herein above, at three computing devices 900-1, 1002-2, and 1002-3 that can be coupled one to another via the network 118. Generally, a computing device 900 may be implemented as, for example, a source computing device 102 having a document preparation module 112 for a source user 122, a deployment device 104 having a document presentation module 114 for a destination user 124, a development device 106 having a font service module 116, an on-chip system or system-on-a-chip (SOC), or any other suitable computing device or computing system.

In an example implementation as shown in FIG. 8, the font service module 116 is executing in the cloud (e.g., on a network-side computing device) via the network 118, such as the internet. However, any of the described modules may execute in the cloud, including on behalf of a corporate user. Although individual device components are specifically illustrated with respect to one particular device (e.g., the computing device 900-2), such components may be included in the other illustrated devices.

The example computing device 900 as illustrated in FIG. 8 includes at least one processing system 902, one or more computer-readable media 904, and one or more I/O interfaces 906 that may be communicatively coupled, one to another. Although not explicitly shown, the computing device 900 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 902 is representative of functionality to perform one or more operations using hardware. Accordingly, the processing system 902 is illustrated as including one or more hardware elements 908 that may be implemented as processors, functional blocks, and so forth. This may include implementation in hardware as an application specific integrated circuit (ASIC), a general-purpose processor, or other logic device formed using e.g. one or more semiconductors. The hardware elements 908 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 904 is illustrated as including memory/storage 910. The memory/storage 910 represents memory/storage capacity associated with one or more computer-readable media. The memory/storage component 910 may include volatile media (e.g., random access memory (RAM)) or nonvolatile media (e.g., read only memory (ROM), flash memory, optical discs, or magnetic disks). The memory/storage component 910 may include fixed media (e.g., RAM, ROM, or a fixed hard drive) or removable media (e.g., a flash memory card, a removable hard drive, or an optical disc). The computer-readable media 904 may be implemented in a variety of other ways as further described below.

The input/output interface(s) 1008 are representative of functionality to allow a user to enter commands or information to computing device 900 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 900 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. As used herein, the terms module, functionality, and component generally refer to software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 904 may include a variety of media that may be accessed by the computing device 900. By way of example, and not limitation, computer-readable media may include "computer-readable storage media" and "computer-readable signal media."

As used herein, the terms "computer-readable storage medium" and "computer readable medium," refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

As used herein, the term "computer-readable signal media" refers to a signal-bearing medium implemented to transmit instructions to hardware of the computing device 900, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 908 and computer-readable media 904 can include modules, programmable device logic, fixed device logic, a combination thereof, and so forth that is implemented in a hardware form that may be employed in some embodiments to implement at least some aspects of the techniques described herein, such as to perform one or more instructions or computing actions. Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 908. The computing device 900 may be configured to implement particular instructions or functions corresponding to software or hardware modules. Accordingly, implementation of a module executable by the computing device 900 as software may be achieved at least partially in hardware, e.g., through use of computer-readable storage media or the hardware elements 908 of the processing system 902. The instructions or functions may be executable/operable by one or more articles of manufacture (e.g., one or more computing devices 900 or processing systems 902) to implement techniques, modules, or examples described herein.

The techniques described herein may be supported by various configurations of the computing device 900 and are not limited to the specific aspects of the example devices described herein. This functionality may also be implemented fully or partially through use of a distributed system, such as a cloud-based server 912 via a platform 914 as described below.

The cloud-based server 912 may include or represent a platform 914 for resources 916. The platform 914 abstracts underlying functionality of hardware (e.g., one or more servers or at least one data center) and software resources of the cloud-based server 912. The resources 916 may include applications or data that can be utilized while computer processing is at least partially executed on servers remote from, or distributed around, the computing device 900. Resources 916 may also include services provided over the Internet or through a subscriber network, such as a cellular or Wi-Fi network.

The platform 914 may abstract resources and functions to connect the computing device 900 with other computing devices or services. The platform 914 may also serve to abstract a scaling of resources to provide a corresponding level of scale to encountered demand for the resources 916 implemented via the platform 914. Accordingly, in an interconnected device embodiment, implementation of functionality described herein may be distributed throughout the illustrated system of FIG. 8, or at least throughout the cloud-based server 912 along with the computing device 900. For example, functionality may be implemented in part on the computing device 900 as well as via the platform 914 that abstracts the functionality of the cloud-based server 912.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system as a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A computer-implemented method for recognizing fonts based on visual similarity, the method comprising:
    receiving, by a graphics editing application executed at a computing device, a document having an input image depicting input text;
    generating, by the graphics editing application, a first initial font-classification score and a second initial font-classification score for the input text by applying a font-recognition neural network to the input text, wherein the font-recognition neural network is trained to associate input images with a plurality of training fonts, wherein the first initial font-classification score indicates a probability of the input text corresponding to a first training font and the second initial font-classification score indicates a probability of the input text corresponding to a second training font;
    selecting, by the graphics editing application, a first local font and a second local font that are available to the graphics editing application from a non-transitory computer-readable storage medium of the computing device;
    extracting, by the graphics editing application, font features corresponding to the first local font and font features corresponding to the second local font;
    computing, by the graphics editing application, a first similarity score for the first local font and a second similarity score for the second local font, wherein the first similarity score (i) is computed based on a distance between the font features of the first local font and font features of the first training font and (ii) indicates a respective similarity between the first local font and the first training font, and wherein the second similarity score (iii) is computed based on a distance between the font features of the second local font and font features of the second training font and (iv) indicates a respective similarity between the second local font and the second training font;
    computing, by the graphics editing application, a first recognition score for the first local font with respect to the input text and a second recognition score for the second local font with respect to the input text, wherein the first recognition score is computed from a weighted sum of the first similarity score and the first initial font-classification score, and wherein the second recognition score is computed from a weighted sum of the second similarity score and the second initial font-classification score; and
    selecting, by the graphics editing application and based on a comparison of the first recognition score and the second recognition score, one of the first local font or the second local font for rendering one or more of (i) the input text depicted in the document and (ii) additional text added to the document via the graphics editing application.

2. The method of claim 1, wherein the input image is a text image including a plurality of glyphs rendered using a font, wherein the input image represents a visual appearance of the font.

3. The method of claim 2, wherein the font depicted in the input image is unavailable at the computing device.

4. The method of claim 1, further comprising:
    computing, by the graphics editing application, an additional recognition score for an additional local font with respect to the input text depicted in the input image, wherein the additional recognition score is computed from a weighted sum of (i) the initial font-classification score and (ii) additional similarity score for the additional local font and the training fonts;

sorting a list of recognition results that includes the local font and the additional local font based on the recognition score and the additional recognition score for presentation on a display of the computing device;

presenting the sorted list on the display; and receiving, by the computing device, an input selecting the local font from the sorted list, wherein selecting the local font based on the recognition score comprises applying the local font based on receiving the input selecting the local font from the sorted list.

5. The method of claim 1, wherein extracting the font features comprises generating feature vectors from a visual appearance of the input text depicted in the input image, wherein each feature vector includes a set of values representing a respective one of the font features.

6. The method of claim 1, wherein determining the similarity score comprises executing a pairwise similarity function between the local font and a respective one of the training fonts.

7. The method of claim 1, wherein computing the similarity score comprises computing an inner product of a local font feature vector representing the font features of the local font and a respective training font feature vector representing the font features of the respective one of the training fonts.

8. The computer-implemented method of claim 1, wherein:

applying the font-recognition neural network to the input text comprises characterizing, with the font-recognition neural network, a visual appearance of the input image as input font features, and the font depicted in the input image is unavailable to the computing device prior to said selecting of the local font.

9. A computing system comprising:

a processing device; and a memory device storing local fonts;

wherein the processing device is configured for executing a graphics editing application comprising instructions that, when executed, perform operations for recognizing fonts based on visual similarity, the operations comprising:

receiving a document having an input image depicting input text;

generating a first initial font-classification score and a second initial font classification score for the input text by applying a font-recognition neural network to the input text, wherein the font-recognition neural network is trained to associate input images with a plurality of training fonts, wherein the first initial font-classification score indicates a probability of the input text corresponding to a first training font and the second initial font-classification score indicates a probability of the input text corresponding to a second training font are available to the graphics editing application from the memory device, extracting font features corresponding to a first local font and font features corresponding to a second local font;

computing a first similarity score for the first local font and a second similarity score for the second local font, wherein the first similarity score (i) is computed based on a distance between font features of the first local font and font features of the first training font and (ii) indicates a similarity between the first local font and the first training font, and wherein the second similarity score (iii) is computed based on a distance between the font features of the second local font and font features of the second training font and (iv) indicates a respective similarity between the second local font and the second training font;

computing a first recognition score for the first local font with respect to the input text and a second recognition score for the second local font with respect to the input text, wherein the first recognition score is computed from a weighted sum of the first similarity score and the first initial font-classification score, and wherein the second recognition score is computed from a weighted sum of the second similarity score and the second initial font-classification score; and selecting, based on a comparison of the first recognition score and the second recognition score, one of the first local font or the second local font for rendering one or more of (i) the input text depicted in the document and (ii) additional text added to the document via the graphics editing application.

10. The computing system of claim 9, wherein the input image is a text image including a plurality of glyphs rendered using a font, wherein the input image represents a visual appearance of the font.

11. The computing system of claim 10, wherein the font depicted in the input image is unavailable at the computing system.

12. The computing system of claim 9, the operations further comprising:

computing an additional recognition score for an additional local font with respect to the input text depicted in the input image, wherein the additional recognition score is computed from a weighted sum of (i) the initial font-classification score and (ii) additional similarity score for the additional local font and an additional training font;

sorting a list of recognition results that includes the local font and the additional local font based on the recognition score and the recognition score for presentation;

configuring a display device to present the sorted list; and receiving an input selecting the local font from the sorted list, wherein selecting the local font based on the recognition score comprises applying the local font based on receiving the input selecting the local font from the sorted list.

13. The computing system of claim 9, wherein determining the similarity score comprises executing a pairwise similarity function between the local font and a respective one of the training fonts.

14. The computing system of claim 9, wherein extracting the font features comprises generating feature vectors from a visual appearance of the input text depicted in the input image, wherein each feature vector includes a set of values representing a respective one of the font features.

15. The computing system of claim 9, wherein computing the first recognition score comprises:

computing the first similarity score by computing an inner product of a local font feature vector representing the font features of the local font and a respective training font feature vector representing the font features of the respective one of the training fonts; and computing the weighted sum of the first similarity score and the first initial font classification score.

16. A non-transitory computer-readable storage medium having executable instructions stored thereon, that, if executed by a computing device, cause the computing device to perform operations for recognizing fonts based on visual similarity, the operations comprising:

receiving a document having an input image depicting input text;

generating a first initial font-classification score and a second initial font-classification score for the input text by applying a font-recognition neural network to the input text, wherein the font-recognition neural network is trained to associate input images with a plurality of training fonts, wherein the first initial font-classification score indicates a probability of the input text corresponding to a first training font, and wherein the second initial font-classification score indicates a probability of the input text corresponding to a second training font;

selecting a first local font and a second local font that are available to the computing device from a memory storing the first local font and the second local font available at the computing device;

extracting font features corresponding to a first local font and font features corresponding to a second local font;

computing a first similarity score for the first local font and a second similarity score for the second local font, wherein the first similarity score (i) is computed based on a respective distance between font features of the first local font and font features of the first training font and (ii) indicates a similarity between the first local font and the first training font, and wherein the second similarity score (iii) is computed based on a distance between the font features of the second local font and font features of the second training font and (iv) indicates a respective similarity between the second local font and the second training font;

computing a first recognition score for the first local font with respect to the input text and a second recognition score for the second local font with respect to the input text, wherein the first recognition score is computed from a weighted sum of the first similarity score and the first initial font-classification score, and wherein the second recognition score is computed from a weighted sum of the second similarity score and the second initial font-classification score; and selecting the first local font or the second local font for rendering one or more of (i) the input text depicted in the document and (ii) additional text added to the document via a graphics editing application.

17. The non-transitory computer-readable storage medium of claim 16, wherein extracting the font features comprises generating feature vectors from a visual appearance of the input text depicted in the input image, wherein each feature vector includes a set of values representing a respective one of the font features.

18. The non-transitory computer-readable storage medium of claim 16, wherein determining similarity score comprises executing a pairwise similarity function between the local font and a respective one of the training fonts.

19. The non-transitory computer-readable storage medium of claim 16, the operations further comprising:

computing an additional recognition score for an additional local font with respect to the input text depicted in the input image, wherein the additional recognition score is computed from a weighted sum of (i) the initial font-classification score and (ii) additional similarity score for the additional local font and an additional training font;

sorting a list of recognition results that includes the local font and the additional local font based on the recognition score and the additional recognition score for presentation on a display;

presenting the sorted list on the display; and receiving an input selecting the local font from the sorted list, wherein selecting the local font based on the recognition score comprises applying the local font based on receiving the input selecting the local font from the sorted list.

20. The non-transitory computer-readable storage medium of claim 16, wherein the input image is a text image including a plurality of glyphs rendered using a font, wherein the input image represents a visual appearance of the font.

* * * * *